United States Patent Office 3,526,654
Patented Sept. 1, 1970

3,526,654
ISOMERIZATION OF 2-PENTENENITRILE TO 3-PENTENENITRILE
Gary Plant Hildebrand, Carrcroft Crest, Wilmington, Del., assignor to E. I. du Pont de Nemours and Company, Wilmington, Del., a corporation of Delaware
No Drawing. Filed May 17, 1968, Ser. No. 729,883
Int. Cl. C07c *121/30*
U.S. Cl. 260—465.9                                 4 Claims

ABSTRACT OF THE DISCLOSURE

Isomerization of 2-pentenenitrile to 3-pentenenitrile at from 25 to 500° C. using a catalyst selected from the class consisting of silica gel, alumina, and sodium-calcium aluminosilicates.

BACKGROUND OF THE INVENTION

The present invention relates to the isomerization of 2-pentenenitriles to 3-pentenenitriles which is useful in reducing a yield loss in the production of adiponitrile from 3-pentenenitriles and 4-pentenenitrile by means of catalytic hydrocyanation. This process of hydrocyanating 3-pentenenitrile or 4-pentenenitrile to form adiponitrile is described in British Pat. No. 1,104,140 published February 21, 1968; Belgian Pat. No. 700,420; U.S. patent applications Ser. No. 679,608 filed Nov. 1, 1967 and Ser. No. 680,969 filed Nov. 6, 1967, both now abandoned. In the normal course of performing this hydrocyanation a starting mixture consisting principally of trans-3-pentenenitrile along with smaller amounts of cis-3-pentenenitrile and 4-pentenenitrile is used, and the reaction is run on a continuous basis at a 20–60 percent conversion to dinitriles. The effluent from a reactor run in such a way contains cis-2-pentenenitrile, trans-2-pentenenitrile, cis-3-pentenenitrile, trans-3-pentenenitrile, 4-petenenitrile, adiponitrile and other dinitriles, along with the catalyst and spent catalyst. The adiponitrile and other dinitriles are separated from the effluent and the adiponitrile further separated as the product. The catalyst is separated and recycled to the hydrocyanation reactor and the spent catalyst is either discarded or regenerated and recycled. The trans-2-pentenenitrile, which is formed during the hydrocyanation reaction, cannot readily be separated from the trans-3-pentenenitrile since its relative volatility with respect to trans-3-pentenenitrile is only 1.018±0.004 and hence it is recycled to the hydrocyanation reactor along with the 3-pentenenitriles and the 4-pentenenitrile. The remaining cis-2-pentenenitrile is distilled overhead and the present invention serves to convert it to a 3-pentenenitrile mixture which then can be recycled to the hydrocyanation reactor thereby avoiding or reducing the loss of starting material through its being isomerized to 2-pentenenitrile in the hydrocyanation reactor.

SUMMARY OF THE INVENTION

The present invention relates to the catalytic isomerization of 2-pentenenitriles to 3-pentenenitriles. Generally the starting 2-pentenenitrile is cis-2-pentenenitrile, although the process is equally applicable to either cis- or trans-2-pentenenitrile. The isomerization is carried out by passing the 2-pentenenitrile over a solid state catalyst at from 25 to 500° C. in either the liquid phase or the vapor phase. The pressure used is not critical and pressures of from 0.5 to 50 atmospheres are satisfactory.

The catalysts useful in the present invention are weakly basic solid state catalysts selected from the class consisting of silica gel, alumina, and sodium-calcium aluminosilicates. The catalyst should either be finely divided or porous so as to provide a large surface area. In the case of a finely divided catalyst the catalyst preferably should be sufficiently divided to pass a 20 mesh sieve.

Any reactor capable of containing a liquid or gaseous medium can be used for performing the present invention, however the preferred apparatus is an evaporator for feeding vapor phase 2-pentenenitrile to a column containing the catalyst. [Preferably after being passed through the reaction column the reactants are passed through a separation column equipped with a takeoff for trans-2-pentenenitrile and 3-pentenenitriles and a separate takeoff or recycling means for cis-2-pentenenitrile.]

DESCRIPTION OF THE PREFERRED EMBODIMENTS

Example I

A 50 ml., three necked glass receiver equipped with a stopcock drain is set up such that one neck is vented to the atmosphere, one is stoppered, and one is connected to the bottom of a vertically disposed water cooled condenser. The bottom of a vertical glass tube 1.5 inch in diameter is mounted in communication with the top of the condenser. The top of the tube is bulb-shaped and equipped with a sample inlet, a sweep gas inlet, and a thermocouple well. The bottom half of the tube is packed with Alcoa F–1 $Al_2O_3$ 10–30 mesh, and the top half of the tube below the bulb is fitted with nickel distillation saddles. The sample inlet is connected to the output side of a bellows pump which is fed from a 500 ml. graduated cylinder. An electric heater is installed in both the top and the bottom half of the tube. Nitrogen gas is fed into the inlet in the bulb at the top of the tube containing the catalyst, at a rate of 2 liters (STP) per minute. The graduated cylinder is charged with 500 ml. of cis-2-pentenenitrile at ambient temperature. The bellows pump is operated to feed cis-2-pentenenitrile to the system at a rate of 2 ml. (liquid measure) per minute. The entire tube is maintained at 200° C. After 250 minutes the operation is shut down.

Gas chromatographic analysis of the collected product in the receiver indicates the presence of 43.3 percent cis-2-pentenenitrile, 34.9 percent trans-2-pentenenitrile, 17.6 percent trans-3-pentenenitrile, and 5.9 percent cis-3-pentenenitrile.

Example II

Example I is repeated except Davison silica gel grade 08 12–25 mesh is substituted for the $Al_2O_3$ used in Example I, the nitrogen flow is adjusted to 1 liter per minute, and the temperature in the bottom half of the tube is maintained at 500° C. and at 200° C. in the top half of the tube. The pentenenitriles (after using cis-2-pentenenitrile starting material) is passed through the apparatus five times. After four passes a steady state has been achieved whose composition is indicated by gas chromatographic analysis to contain 32.3 weight percent cis-2-pentenenitrile, 29.8 weight percent trans-2-pentenenitrile, 23.4 weight percent trans-3-pentenenitrile, 11.1 weight percent cis-3-pentenenitrile, 0.10 weight percent trans-2-methyl-2-butenenitrile, 0.29 weight percent cis-2-methyl-2-butenenitrile, 0.42 weight percent valeronitrile, and 2.51 weight percent 4-pentenenitrile.

Example III

A sample of cis-2-pentenenitrile is placed in a 30 ml. vial along with 2 g. of ⅛ inch extensions of eta alumina at ambient temperature (approximately 25° C.). After six months gas chromatographic analysis indicates the following pentenenitrile isomer distribution:

| Pentenenitrile isomer: | Wt. percent |
| --- | --- |
| Cis-2-pentenenitrile | 59.1 |
| Trans-2-pentenenitrile | 24.1 |
| Trans-3-pentenenitrile | 15.4 |
| Cis-3-pentenenitrile | 1.4 |

This example reveals that 2-pentenenitrile can isomerize to 3-pentenenitrile at ambient temperature.

Example IV

Example I is repeated except 5A molecular sieve ¹⁄₁₆ inch pellets ($Ca_{0.5}Na_3[(AlO_2)_{12}(S:O_2)_{12}] \cdot XH_2O$ having a nominal pore diameter of 5 angstroms, a settled bulk density of 45 lb./cu. ft., an equilibrium water content of 21.5 wt. percent and a water content as used of <1.5 wt. percent) are substituted for the alumina the temperature in the bottom half of the tube is maintained at 250° C. and at 150° C. in the top half of the tube. After a single pass of cis-2-pentenenitrile through the apparatus gas chromatographic analysis indicates the product contains 57.6 percent cis-2-pentenenitrile, 19.7 percent trans-2-pentenenitrile, 17.9 percent trans-3-pentenenitrile, 0.9 percent 4-pentenenitrile, and 6.2 percent cis-3-pentenenitrile.

What is claimed is:

1. A process of isomerizing a 2-pentenenitrile to 3-pentenenitrile comprising contacting a 2-pentenenitrile with a catalyst selected from the class consisting of silica gel, alumina, and sodium-calcium aluminosilicates at from 25 to 500° C.

2. The process of claim 1 wherein the catalyst is silica gel.

3. The process of claim 1 wherein the catalyst is alumina.

4. The process of claim 1 wherein the catalyst is a sodium-calcium aluminosilicate.

References Cited

UNITED STATES PATENTS 3,437,698   4/1969   O'Grady et al. -- 260—465.9 XR

JOSEPH PAUL BRUST, Primary Examiner

U.S. Cl. X.R.

260—465.1, 465.8